United States Patent
Hasegawa et al.

(10) Patent No.: US 8,344,573 B2
(45) Date of Patent: Jan. 1, 2013

(54) STATOR FOR USE IN ELECTRIC ROTATING MACHINE

(75) Inventors: Syo Hasegawa, Chiryu (JP); Keigo Moriguchi, Takahama (JP); Hiroaki Takeda, Toyota (JP)

(73) Assignee: Denso Corporation, Kariya (JP)

( * ) Notice: Subject to any disclaimer, the term of this patent is extended or adjusted under 35 U.S.C. 154(b) by 216 days.

(21) Appl. No.: 13/011,153

(22) Filed: Jan. 21, 2011

(65) Prior Publication Data

US 2011/0181143 A1 Jul. 28, 2011

(30) Foreign Application Priority Data

Jan. 22, 2010 (JP) ................................. 2010-011686

(51) Int. Cl.
 *H02K 1/00* (2006.01)
(52) U.S. Cl. ........................................ 310/180; 310/184
(58) Field of Classification Search .................. 310/180, 310/184, 208
See application file for complete search history.

(56) References Cited

U.S. PATENT DOCUMENTS

| 5,994,813 | A | 11/1999 | Umeda et al. | |
|---|---|---|---|---|
| 6,181,043 | B1 * | 1/2001 | Kusase et al. | 310/201 |
| 6,462,453 | B1 * | 10/2002 | Asao et al. | 310/179 |
| 2002/0033649 | A1 * | 3/2002 | Oohashi et al. | 310/184 |
| 2004/0145257 | A1 * | 7/2004 | Oohashi | 310/71 |

FOREIGN PATENT DOCUMENTS

JP        11-341730        12/1999

* cited by examiner

*Primary Examiner* — Nguyen N Hanh
(74) *Attorney, Agent, or Firm* — Nixon & Vanderhye PC

(57) ABSTRACT

A stator for use in an electric rotating machine is provided which includes a stator winding wound through slots of a stator core. The stator winding is made up of a plurality of conductor segments connected together. Each of the conductor segments includes an in-slot portion disposed inside one of the slots and out-slot portions extending from the in-slot portion outside at least one of the ends of the stator core. Ends of the out-slot portions are joined together to form the stator winding. The joints of the ends of the out-slot portions have a given pattern of texture formed on surfaces thereof and coated with an insulating material. The pattern of texture enhances the adhesion of the insulating coatings to the surfaces of the joints and ensures the stability in electric insulation of the joints.

5 Claims, 7 Drawing Sheets

STATOR FOR USE IN ELECTRIC ROTATING MACHINE

CROSS REFERENCE TO RELATED DOCUMENT

The present application claims the benefit of priority of Japanese Patent Application No. 2010-11686 filed on Jan. 22, 2010, the disclosure of which is incorporated herein by reference.

BACKGROUND OF THE INVENTION

1. Technical Field of the Invention

The present invention relates generally to a stator which may be installed in a motor-generator or an AC generator for use in automotive vehicles such as electric vehicles or hybrid vehicles.

2. Background Art

Japanese Patent First Publication No. 11-341730 discloses a stator of an electric rotating machine. The stator is equipped with a stator core facing a rotor and a stator winding wound in the stator core. The stator core has a plurality of slots formed therein. The stator winding is made up of a plurality of conductor segments each of which includes in-slot portions disposed within the slots of the stator core and coil end portions extending from the slot outside either of axially-opposed ends of the stator core. The coil end portions are welded to make a teardrop-shaped joint without any sharp edges. The joints are arrayed at a regular interval away from each other in a circular form and coated with insulating resin to achieve electric insulation between the joints themselves or between the joints and peripheral members such frames of a housing of an AC generator.

The electric rotating machine, as disclosed in the above publication, has a cooling fan installed on the rotor to cool the joints which are subjected to high temperature during running of the electric rotating machine. The cooling fan works to blow cooling air from inside the inner periphery of the array of the joints toward air outlets formed in a frame disposed outside the array of the joints to create cooling air hits on the joints. The cooling air usually contains dust or numerous impurities from the atmosphere. The hits of the cooling air on the joints may result in physical damages to the insulating coating on the joints. The insulating coating is of a teardrop-shape contoured to conform with the joint and soft in hardness. The hits of the cooling air or the impurities on the joints may, therefore, result in removal of the insulating coating from the joints, which leads to a failure in insulation between the joints themselves or between the joints and the peripheral member.

SUMMARY OF THE INVENTION

It is therefore a principal object of the invention to avoid the disadvantages of the prior art.

It is another object of the invention to provide a stator for use in an electric rotating machine which ensures the stability in electric insulation of a stator winding.

According to one aspect of the invention, there is provided a stator for use in an electric rotating machine such as an electric motor, an electric generator, or an motor-generator. The stator comprises: (a) a stator core with ends opposed to each other in an axial direction thereof, the stator core having a plurality of slots formed therein; (b) a stator winding wound through the slots of the stator core, the stator winding being made up of a plurality of conductor segments connected together, each of the conductor segments including an in-slot portion disposed inside one of the slots and out-slot portions extending from the in-slot portion outside at least one of the ends of the stator core, ends of the out-slot portions being joined together to form the stator winding, joints of the ends of the out-slot portions having a given pattern of texture formed on surfaces thereof; and (c) insulating coatings formed on the pattern of texture on the surfaces of the joints of the ends of the out-slot portions.

The formation of the pattern of texture on each of the joints results in an increased area of the surface of the joint to which the insulating coating is adhered and entry of the insulating coating deep into recesses in the surface of the joint, which leads to an increased degree of adhesion of the insulating coating to the joint. This improves the adhesion of the insulating coatings to joints against hits of cooling air contacting dust or numerous impurities on the surface of the insulating coatings on the joints and ensures the stability in insulating the joints electrically.

In the preferred mode of the invention, the ends of the out-slot portions are made of copper oxide. The pattern of texture on the surfaces of the joints of the out-slot portions is formed by welding the ends to create blow holes.

The pattern of texture on the surfaces of the joints of the out-slot portions may alternatively be formed by pressing a knurling tool with webbing irregularities against the surfaces of the joints to transfer a pattern of the mesh-shaped irregularities onto the surfaces of the joints.

The pattern of texture on the surfaces of the joints of the out-slot portions may alternatively be formed by shot-blasting the surface of the joints.

The pattern of texture on the surfaces of the joints of the out-slot portions may alternatively be formed by a plurality of grooves formed in the surfaces of the joints.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 5(*b*) is a partially perspective view which shows a joint of ends of conductor segments making up a stator winding;

FIGS. 5(*c*) to 5(*f*) are partially perspective views which illustrate possible patterns on a surface of the joint of the ends of the conductor segments of FIG. 5(*b*);

DESCRIPTION OF THE PREFERRED EMBODIMENTS

Figure 1:
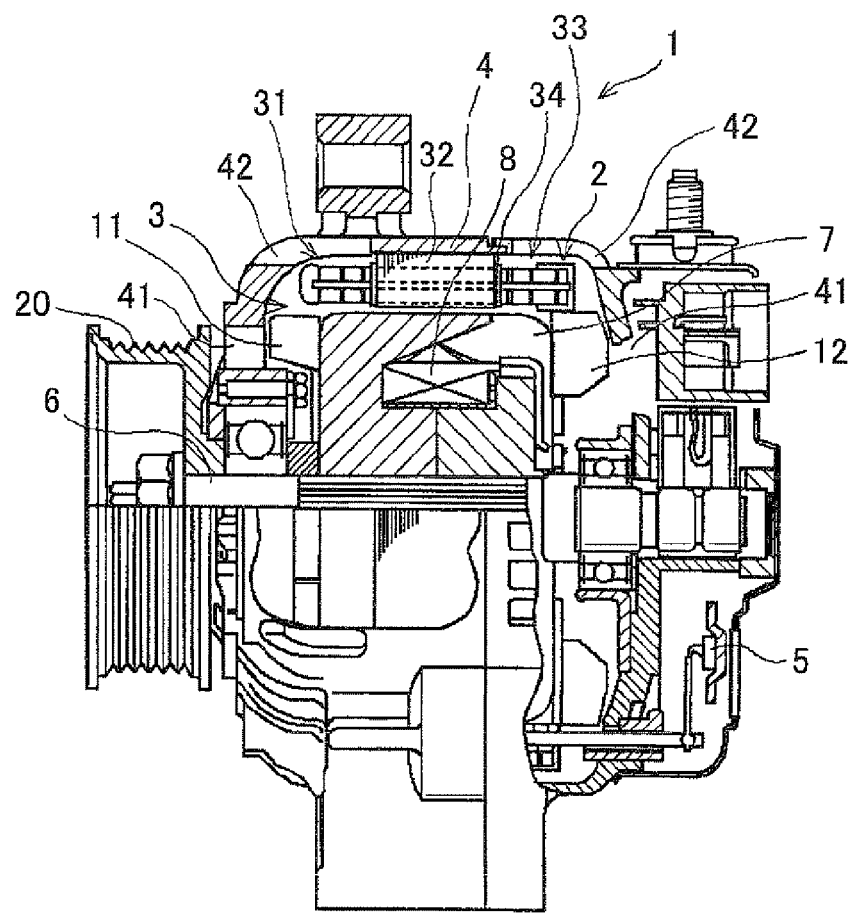
FIG. 1 is a partially sectional view which shows a structure of an AC generator equipped with a stator according to the invention.

Referring to the drawings, wherein like reference numbers refer to like parts in several views, particularly to FIG. 1, there is shown an electric rotating machine 1 according to an embodiment of the invention. The electric rotating machine 1, as referred to herein, is used as an AC generator to be mounted in an automotive vehicle.

The AC generator 1 includes a stator 2, a rotor 3, a frame 4, and a rectifier 5. The stator 2 is equipped with a stator core 32, a plurality of conductor segments (also called electric wire segments) 33, and an insulator 34. The conductor segments 33 make up a stator winding. The insulator 34 insulates the stator core 32 and the conductor segments 33 electrically from each other. The stator core 32 is made of a stack of annular steel plates and has a plurality of slots 35 formed therein. The slots 35 extend through the stator core 32 in an axial direction thereof and are arrayed in a circumferential direction of the stator core 32. The slots 35 open at an inner circumference of the stator core 32. The conductor segments 33 are disposed in the slots 35 and exposed outside axially-opposed ends of the stator core 32 to form coil ends 31. The structure of the stator 2 will be described later in detail.

The rotor 3 is made up of a field coil 8 and front and rear pole cores 7 by which the field coil 8 is retained. The field coil 8 is made by winding insulated copper wire coaxially into a cylindrical shape. The pole cores 7 have claws and are joined to nip the field coil 8. A rotating shaft 6 passes through the pole cores 7. The front pole core 7 has an axial-flow cooling fan 11 welded to an end surface thereof. The cooling fan 11 works to suck air from the front of the AC generator 1 and blow it in a radial and an axial direction thereof. Similarly, the rear pole core 7 has a centrifugal cooling fan 12 welded to an end surface thereof. The cooling fan 12 works to suck air from the rear of the AC generator 1 and blow it in a radial and an axial direction thereof.

The frame 4 has the stator 2 and the rotor 3 disposed therein. The rotor 3 is retained by the frame 4 to be rotatable around the shaft 6. The stator 2 is also retained by the frame 4 at an interval away from the outer circumference of the pole cores 7 of the rotor 3. The frame 4 has air outlets 42 and air inlets 41 formed therein. The air outlets 42 face the coil end 31 of the stator 2. The air inlets 41 formed in one of axially-opposed ends of the frame 4.

The shaft 6 has a pulley 20 joined thereto. When torque, as produced by an internal combustion engine (not shown) mounted in the automotive vehicle, is transmitted to the pulley 20 through a belt, the rotor 3 will rotate in a given normal direction. A controller (not shown) applies excitation voltage to the field coil 8 of the rotor 3 to magnetize the claws of the pole cores 7, thereby generating a three-phase AC voltage at the stator winding. The rectifier 5 then outputs a DC current from an output terminal thereof.

Figure 2:
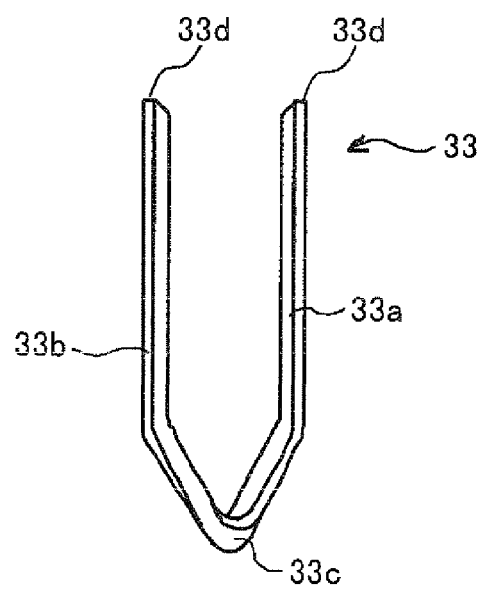
FIG. 2 is a perspective view which shows a conductor segment making up a stator winding.

FIG. 2 is a perspective view which illustrates one of the conductor segments 33 before installed in the stator core 32.

Figure 3:
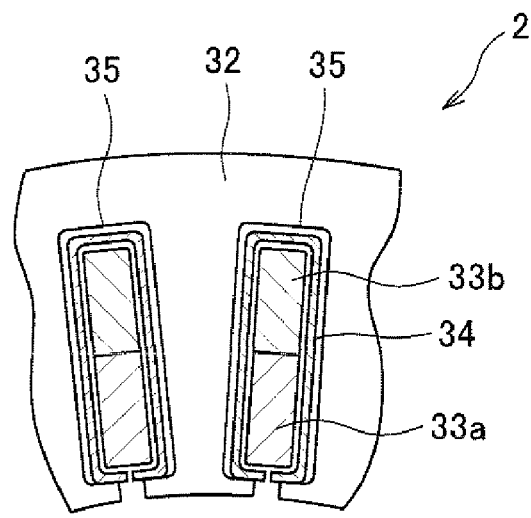
FIG. 3 is a partially transverse sectional view which shows a stator of the AC generator of FIG. 1.
Figure 4:
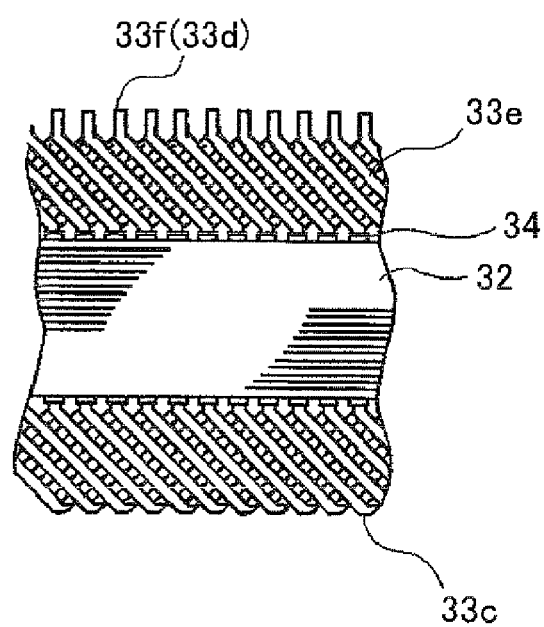
FIG. 4 is a partially side view which shows an arrangement of a stator winding.

FIG. 3 is a partially transverse sectional view of the stator 2. FIG. 4 is a partial side view of the stator 2. FIGS. 5(a) to 5(f) are perspective views which illustrate a joint of the conductor segments 33 of the stator winding. FIG. 6 is a partial perspective view which illustrates the coil ends 31 on the axially-opposed ends of the stator 2.

The conductor segment 33 is, as illustrated in FIG. 2, formed by V- or U-shaped wire made of a copper bar or strip. The conductor segment 33 includes a turned portion 33c, an inner side conductor portion 33a, and an outer side conductor portion 33b. The inner side conductor portion 33a extends from one of ends of the turned portion 33c and is disposed in the slot 35 closer to an inner circumference of the stator core 32. The outer side conductor portion 33b extends from the other end of the turned portion 33c and is placed inside the slot 35 closer to an outer circumference of the stator core 32. Each of the inner and outer side conductor portions 33a and 33b is made up of an in-slot portion which extends straight and is to be placed inside the slot 35 and an out-slot portion which is to be disposed outside the slot 35.

The two conductor segments 33 are disposed in each of the slots 35. The ends 33d of the conductor segment 33 in each of the slots 35 are joined to those of the conductor segment 33 in another slot 35 to make the stator winding of the stator 2. Each of the inner side conductor portion 33a and the outer side conductor portion 33b of each of the conductor segments 33 is, as clearly illustrated in FIG. 3, rectangular in transverse section thereof. Long sides of each of the inner side conductor portion 33a and the outer side conductor portion 33b extend in a radial direction of the stator core 32, while short sides thereof extend in a circumferential direction of the stator core 32.

The turned portions 33c of the conductor segments 33 are, as can be seen from FIG. 4, arranged outside one of the ends of the stator core 32. The ends 33d of the conductor segments 33 are arrayed outside the other end of the stator core 32. Portions 33e of the conductor segments 33 which define one of the coil ends 31 slant to the end of the stator core 32. Specifically, the slant portions 33e placed closer to the outer circumference of the stator core 32 (i.e., outward of the stator core 32) extend in a circumferential direction of the stator core 32 which is opposite to that in which the slant portions 33d placed closer to the inner circumference of the stator core 32 (i.e., inward of the stator core 32) extend. The outward slant portions 33e are, as can be seen from FIG. 4, all oriented in the same circumferential direction of the stator core 32. Similarly, the inward slant portions 33d are all oriented in the same circumferential direction of the stator core 32.

The joining of the ends 33d of the conductor segments 33 is preferably achieved by TIG (TungstenInert-Gas) welding. The TIG welding is a welding technique which produces an arc between a tungsten electrode and a work piece within an inert gas to melt the work piece and a filler metal thermally to join them and has the advantage that it is possible to the quantity of heat to be added to the work piece and the filler metal and the amount of the filler metal to be added to the work piece independently from each other. The TIG welding is, therefore, effective in melting only the ends 33d of the conductor segments 33 to make joints or welds 33f.

Figure 5A:
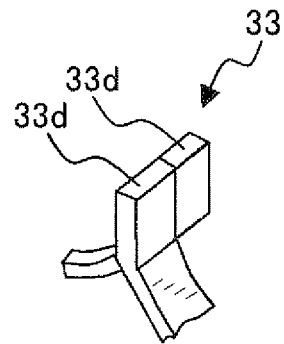
FIG. 5 (*a*) is a partially perspective view which shows an arrangement of ends of conductor segments making up a stator winding.
Figure 5B:
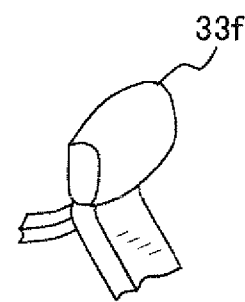
Figure 6:
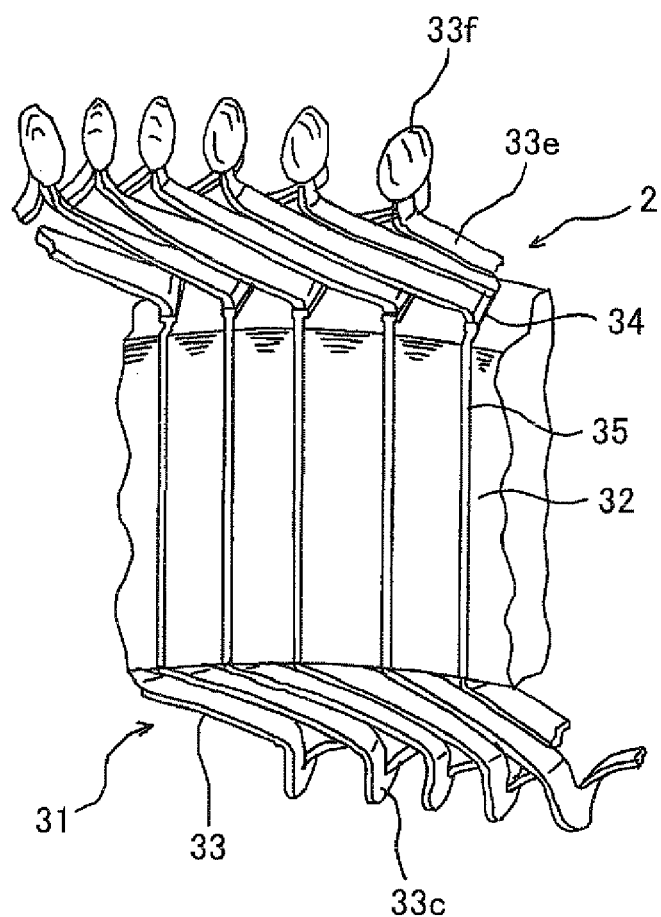
FIG. 6 is a partially perspective view which illustrates an array of welds of ends of conductor segments making up a stator winding.

Each of the welds 33f is, as illustrated in FIG. 5(a), formed by arranging the ends 33d of adjacent two of the conductor segments 33 in direct contact with each other, placing a tungsten electrode-built in nozzle close to surfaces of contact between the ends 33d, and TIG-welding them. In the case where the conductor segments 33 are made of copper that is high in thermal conductivity, the ends 33d and their neighborhoods are usually melted by the TIG welding, so that the whole of each of the welds 33f will be, as illustrated in FIG. 5(b), rounded by the surface tension thereof into a teardrop-shape without any sharp edges.

Figure 5C:
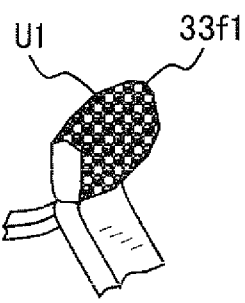
Figure 5D:
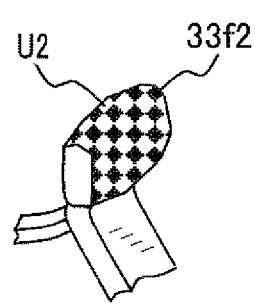
Figure 5E:
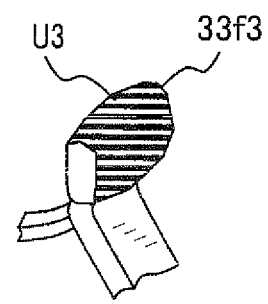
Figure 5F:
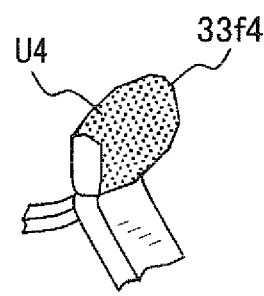

Each of the welds 33f is, as described above, approximately teardrop-shaped and also textured to have any of patterns, as illustrated in FIGS. 5(c) to 5(f). The weld 33f/1, as illustrated in FIG. 5(c), has an irregular pattern U1 of texture on the surface thereof which is created by blow holes. The weld 33f/2, as illustrated in FIG. 5(d), has a webbing or houndstooth pattern U2 of texture. The weld 33f/3, as illustrated in FIG. 5(e), has a grooved pattern U3 of texture which is created by grooves formed in the surface of the weld 33f/3 at regular intervals away from each other. The weld 33f/4, as illustrated in FIG. 5(f), has a sand- or dot-shaped pattern U4 of texture formed on the surface thereof. The formation of these patterns will be described later in detail.

A sequence of steps of producing the stator winding will be described below.

First, the U-shaped conductor segments 33 are inserted into the slots 35 of the stator 2 with the outer side conductor portion 33b being disposed outward in the slot 35 and the inner side conductor portion 33a being disposed in the slot 35 close to an opening of the slot 35. The turned portions 33c are, as described above, arrayed at regular intervals along the circumference of one of the axially-opposed ends of the stator core 32. Each of the conductor segments 33 is made of a copper plate bent by a press into a U-shape. The inner side conductor portion 33a and the outer side conductor portion 33b are press-fitted into the slot 35 with an electric insulator 34 being interposed between substantially parallel side walls of the inner side conductor portion 33a and the outer side conductor portion 33b and an inner side wall of the slot 35.

Next, the ends 33d of each of the conductor segments 33 which are located above the end of the stator core 32 opposite to the turned portions 33c are bent in opposite circumferential directions of the stator core 32. The ends 33d of two of the conductor segments 33 which are disposed outward and inward in the slots 35, respectively, are joined by the TIG welding to make the weld 33f, as illustrated in FIG. 5(b). The welds 33f of all the conductor segments 33 are located on substantially the same level from the end of the stator core 32.

The manner in which the welds 33f are made to have any of the patterns of texture, as illustrated in FIGS. 5(c) to 5(f) will be described below.

The irregular pattern U1 of texture in FIG. 5(c) is formed by TIG-welding the ends 33d of the conductor segments 33 which are made of copper oxide such as tough pitch copper that is high in concentration of oxygen. Specifically, moisture in the atmosphere is resolved into hydrogen and oxygen by the welding heat. The hydrogen enters melted copper of the ends 33d, so that oxygen (O) in copper oxide (CuO) is combined with hydrogen (H) into water ($H_2O$). The water is vaporized by the welding heat into water vapors. The water vapors then escape from the weld 33f/1, thus resulting in formation of cavities or blow holes in the weld 33f/1. The formation of the blow holes usually results in a decrease in mechanical strength of the weld 33f/1. It is, thus, advisable that the number of the blow holes be controlled to ensure a required strength of the weld 33f/1. For instance, in the case where the diameter of the outer circumference of the stator core 32 is 100 mm to 150 mm, and the ninety six (96) welds 33f are arranged annularly above the end of the stator core 32, the depth and the diameter of the blow holes are 0.03 mm to 0.3 mm.

The houndstooth pattern U2 of texture on the weld 33f/3, as illustrated in FIG. 5(d), is formed by pressing a knurling tool with houndstooh-shaped irregularities against the surface of the weld 33f/2 to transfer the pattern of the irregularities onto the weld 33f/2. The houndstooth pattern U2 of texture may alternatively be made by cutting or etching the surface of the weld 33f/2. For instance, in the case where the diameter of the outer circumference of the stator core 32 is 100 mm to 150 mm, and the ninety six (96) welds 33f are arranged annularly above the end of the stator core 32, the depth and the diameter of the houdstooth irregularities transferred onto the surface of the weld 33f are 0.1 mm to 0.4 mm.

The grooved pattern U3 of texture on the weld 33f/3, as illustrated in FIG. 5(e), is formed by cutting or etching the surface of the weld 33f/3 to form an array of grooves. The array of grooves may alternatively be made by pressing a knurling tool with grooves against the surface of the weld 33f/3 to transfer the pattern of the grooves onto the surface of the weld 33f/3. For instance, in the case where the diameter of the outer circumference of the stator core 32 is 100 mm to 150 mm, and the ninety six (96) welds 33f are arranged annularly above the end of the stator core 32, the depth and the width of the grooves formed in the surface of the weld 33f are 0.1 mm to 0.5 mm.

The dot-shaped pattern U4 of texture on the weld 33f/4 is formed by shot-blasting the surface of the weld 33f/4 using sand or small steel balls. For instance, in the case where the diameter of the outer circumference of the stator core 32 is 100 mm to 150 mm, and the ninety six (96) welds 33f are arranged annularly above the end of the stator core 32, the depth and the diameter of the dots formed in the surface of the weld 33f are 0.03 mm to 0.3 mm.

After the welds 33f are made to have any of the patterns of texture, as illustrated in FIGS. 5(c) to 5(f), in the above manner, the stator 2 is oriented with the welds 33f facing downward, immersed in a bath filled with insulation liquid or powder, lifted up from the bath, and then dried to make insulating coatings on the welds 33f.

As apparent from the above discussion, the insulating coating is formed on the pattern U1, U2, U3, or U3 of texture on each of the welds 33f of the conductor segments 33, thus resulting in an increase in area of the weld 33f to which the insulating coating is adhered and entry of the insulating coating deep into recesses in the surface of the weld 33f, which leads to an increased degree of adhesion of the insulating coating to the weld 33f. This improves the adhesion of the insulating coatings to welds 33f against hits of cooling air contacting dust or numerous impurities on the surface of the insulating coatings on the welds 33f and ensures the stability in insulating the welds 33f electrically.

The ends 33d of all the U-shaped conductor segments 33 are, as described above, arrayed above one of the ends of the stator core 32, thereby eliminating the need for reversing the stator core 32 when the ends 33d are TIG-welded. The use of the conductor segments 33 that are identical in shape and size permits the welds 33f to be located on substantially the same level from the end of the stator core 32, thus allowing the welds 33f to be immersed in the bath of insulation liquid or powder simultaneously, which leads to a simplified process of making the insulating coatings on the welds 33f.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims.

Figure 7:
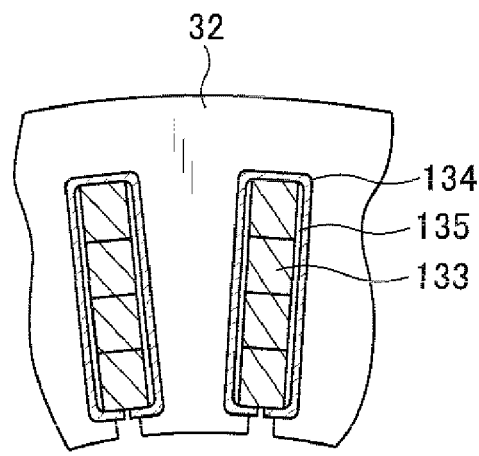
FIG. 7 is a partially transverse sectional view which illustrates a modification of an arrangement of conductor segments in a stator of the AC generator of FIG. 1.

For example, the stator core 32 of the above embodiment has two of the conductor segments 33 disposed in each of the slots 35, but may be designed to have three or more of the conductor segments 33 arrayed in each of the slots 35. FIG. 7 illustrates a modification of the stator core 32. The stator core 32 has slots 135 formed in the same manner, as described above. In each of the slots 135, four conductor segments 133 are aligned in a radial direction of the stator core 32 in the form of a stack of multiple layers.

Figure 8:
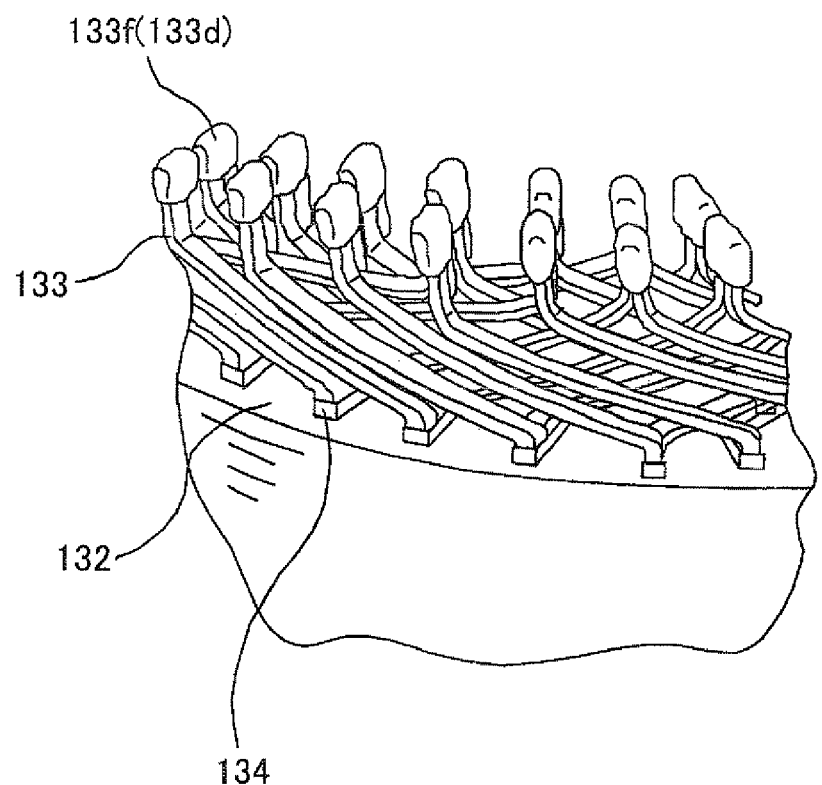
FIG. 8 is a partially perspective view which illustrates an array of welds of ends of the conductor segments of FIG. 7.

An insulator 134 is disposed between the array of the conductor segments 133 and an inner wall of each of the slots 135. Ends of the conductor segments 133 are joined, as illustrated in FIG. 8. Four of the conductor segments 133 fit in each of the slots 135 extend alternately in opposite circumferential directions of the stator core 32. Specifically, end portions of the conductor segments 133 disposed in a radially outermost position within the slots 135 slant in a clockwise direction, as viewed in the drawing, while end portions of the conductor segments 133 disposed in a radially innermost position within the slots 135 slant in a counterclockwise direction, as viewed in the drawing. The ends 133$d$ of the conductor segments 133 in each of the slots 135 are welded to those of the conductor segments 133 in one of the slots 135 which is located at an interval of a given number of the slots 135. The end 133$d$ of the conductor segment 133 disposed in the radially innermost position within the slot 135 is joined to that of the conductor segment 133 disposed in the second radially innermost position within the slot 135. The end 133$d$ of the conductor segment 133 disposed in the third radially innermost position within the slot 135 is joined to that of the conductor segment 133 disposed in the radially outermost position within the slot 135. The welds 133$f$ are disposed on one of the ends of the stator core 32 in the form of two annular arrays. Each of the welds 133$f$ is separate from circumferentially and radially adjacent ones of the welds 133$f$.

The teardrop-shape of the TIG welded ends 33$d$ or 133$d$ of the conductor segments 33 or 133 enables the ends 33$d$ or 133$d$ to be arrayed close to each other even in the case where the stator 2 is installed in a small-sized AC generator for automotive vehicles without changing the number of the slots 35 or 135 and sacrificing the electric insulation of the ends 33$d$ or 133$d$. The conductor segments 33 or 133 may be designed into a shape which is not equipped with the turned portions 33$c$.

Figure 9:
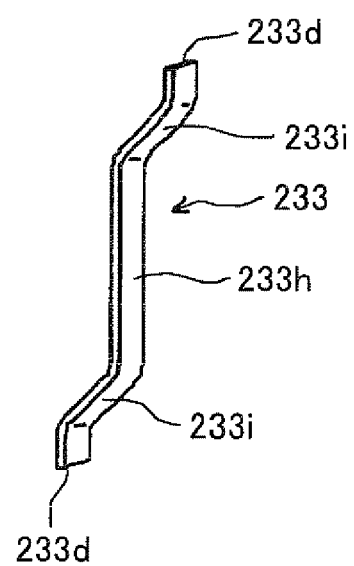
FIG. 9 is a perspective view which shows a modification of a conductor segment making up a stator winding.
Figure 10:
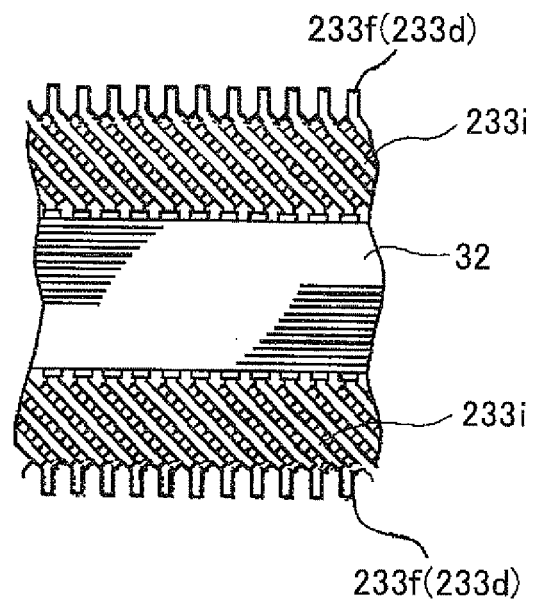
FIG. 10 is a partially side view which shows an arrangement of the conductor segment of FIG. 9.

FIG. 9 illustrates a conductor segment 233 that is a modification of the conductor segment 33. The conductor segments 233 does not have the turned portion 33$c$ and is made up of an in-slot portion 233$h$ and out-slot portions 233$i$ extending from ends of the in-slot portion 233$h$. The in-slot portion 233$h$ extends straight and is to be disposed inside each of the slots 35 of the stator core 32. The out-slot portions 233$i$ are bent from the in-slot portion 233$h$ and to be disposed outside each of the slots 35 in an axial direction of the stator core 32. The out-slot portions 233$i$ are inclined at a given angle to the ends of the stator core 32. The out-slot portions 233$i$ of the conductor segments 233 in each of the slots 35 are, as can be seen from FIG. 10, welded at ends thereof to those of the out-slot portions 233$i$ of the conductor segment 233 extending from another of the slots 35 to make the stator winding. The welds 233$f$ of the conductor segments 233 are arrayed above the ends of the stator core 32 in the circumferential direction thereof and to be cooled by the cooling fans 11 and 12 secured to the ends of the rotor 2.

The welds 233$f$ are, like in the above embodiment, coated with an insulating material and have any of the patterns U1, U2, U3, and U4 of texture, as illustrated in FIGS. 5($c$) to 5($f$), to ensure a degree of adhesion of the insulating coatings to the surfaces thereof which is great enough to hold them from being removed when the surface of the insulating coating is damaged by cooling air containing dust or impurities.

The AC generator 1 may alternatively be of an internal cooled type which is equipped with only a single centrifugal cooling fan. The AC generator 1 may be equipped with a cooling fan which blows air to the welds 33$f$ in the axial direction of the stator 2.

Figure 11:
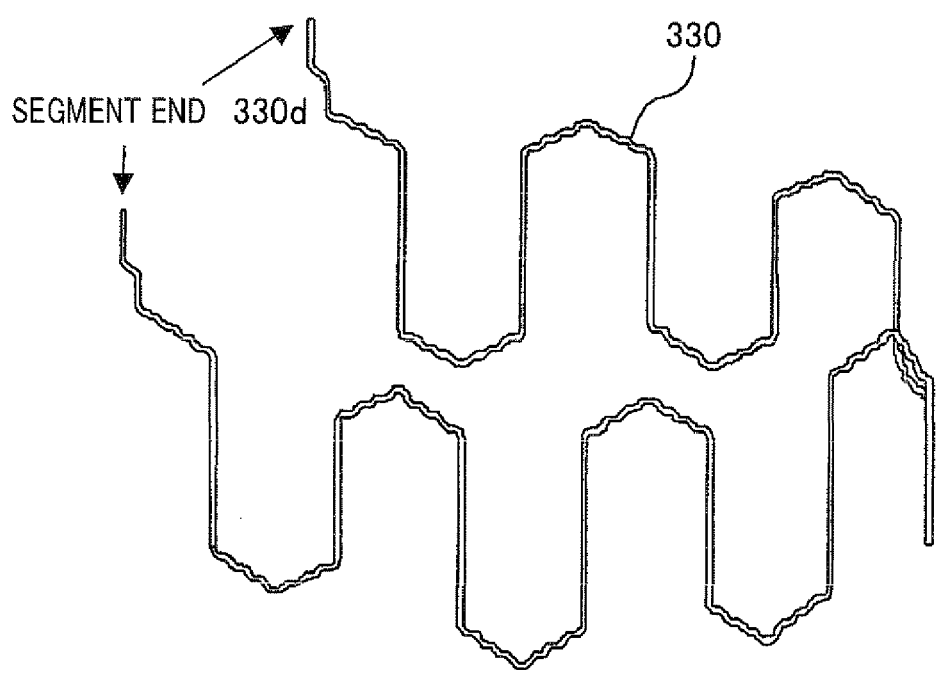
FIG. 11 is a perspective view which shows a modification of conductor segments making up a stator winding.
Figure 12:
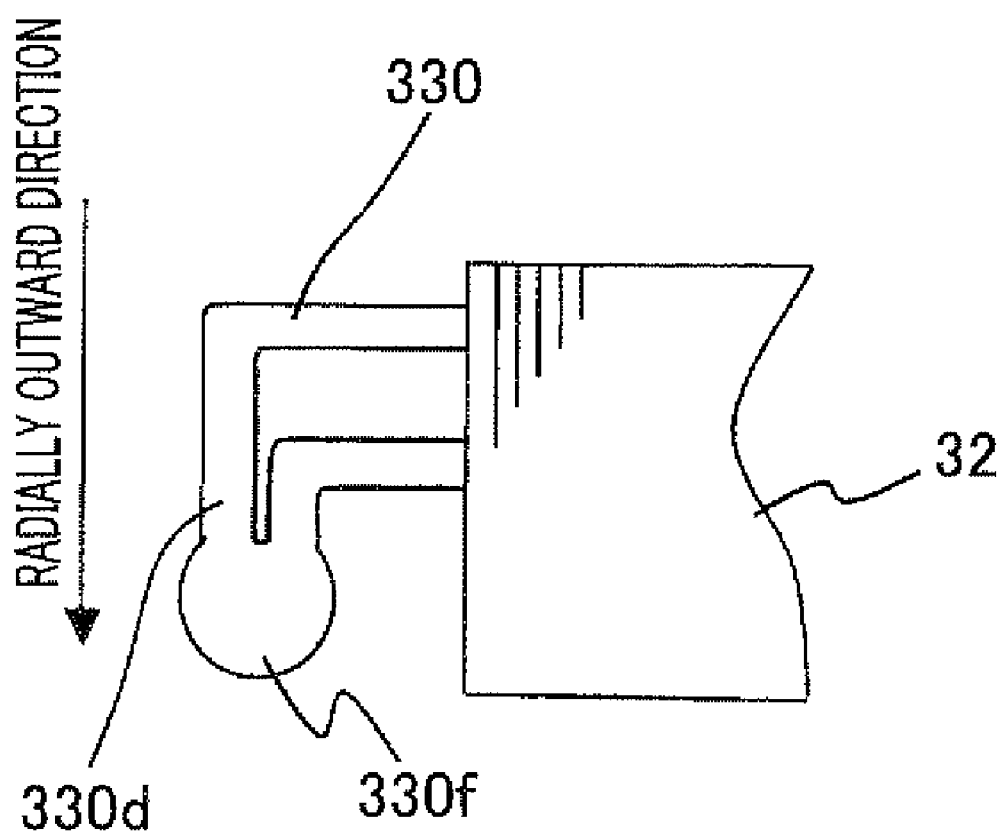
FIG. 12 is a partially view which shows a weld of ends of the conductor segments of FIG. 11.

The stator winding may alternatively be, as illustrated in FIG. 11, made by a plurality of conductor segments 330 (only two are shown for the brevity of illustration) each of which is formed by a string of the U-shaped conductor segments 33 of FIG. 2 connected together. Each of the conductor segments 330 is wound through a given number of the slots 35. Ends 330$d$ of the conductor segments 330 extending from the same slot 35 are, as illustrated in FIG. 12, bent radially outwardly of the stator core 32 and welded together, thereby forming one of multiple phase windings. The ends 330$d$ are, like in the above embodiment, made to have any of the patterns U1, U2, U3, and U4 of texture of FIGS. 5($c$) to 5($f$) and coated with an insulating material.

The stator 2 of the invention is also useful in AC generators designed to cool the stator 2 using coolant such as oil in terms of an increased degree of adhesion of the insulating coating to the welds of the stator winding.

The ends 33$d$, 133$d$, 233$d$, or 330$d$ of the conductor segments 33, 133, 233, or 330 may alternatively be joined together by non-contact welding techniques such as arc welding.

The stator 2 may alternatively be employed in motor-generators for hybrid vehicles.

What is claimed is:

1. A stator for use in an electric rotating machine comprising:
a stator core with ends opposed to each other in an axial direction thereof, the stator core having a plurality of slots formed therein;
a stator winding wound through the slots of the stator core, the stator winding being made up of a plurality of conductor segments connected together, each of the conductor segments including an in-slot portion disposed inside one of the slots and out-slot portions extending from the in-slot portion outside at least one of the ends of the stator core, ends of the out-slot portions being joined together to form the stator winding, joints of the ends of the out-slot portions having a given pattern of texture formed on surfaces thereof; and
insulating coatings formed on the pattern of texture on the surfaces of the joints of the ends of the out-slot portions.

2. A stator as set forth in claim 1, wherein the ends of the out-slot portions are made of copper oxide, the pattern of texture on the surfaces of the joints of the out-slot portions being formed by welding the ends to create blow holes.

3. A stator as set forth in claim 1, wherein the pattern of texture on the surfaces of the joints of the out-slot portions is formed by pressing a knurling tool with webbing irregularities against the surfaces of the joints to transfer a pattern of the mesh-shaped irregularities onto the surfaces of the joints.

4. A stator as set forth in claim 1, wherein the pattern of texture on the surfaces of the joints of the out-slot portions is formed by shot-blasting the surface of the joints.

5. A stator as set forth in claim 1, wherein the pattern of texture on the surfaces of the joints of the out-slot portions is formed by a plurality of grooves formed in the surfaces of the joints.

* * * * *